(12) United States Patent
Nagai et al.

(10) Patent No.: US 6,394,060 B2
(45) Date of Patent: May 28, 2002

(54) LUBRICATING METHOD AND DEVICE OF INTERNAL COMBUSTION ENGINE

(75) Inventors: Noboru Nagai, Hachioji; Yumin Liu, Fussa, both of (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 09/764,259

(22) Filed: Jan. 19, 2001

(30) Foreign Application Priority Data

Jan. 21, 2000 (JP) ........................................ 2000-012431

(51) Int. Cl.[7] ................................................. F01M 1/04
(52) U.S. Cl. ................................... 123/196 R; 184/6.26
(58) Field of Search ....................... 123/196 R; 184/6.26

(56) References Cited

FOREIGN PATENT DOCUMENTS

EP 0 779 412 A2 * 12/1996
JP 8-260926 A * 10/1996

* cited by examiner

Primary Examiner—Noah P. Kamen
(74) Attorney, Agent, or Firm—Nixon Peabody LLP; Donald R. Studebaker

(57) ABSTRACT

An object of the present invention is to provide an improved lubricating method and device for the internal combustion engine, which allows the engine to be lubricated by taking advantage of engine vibration without using other power source. The lubricating device includes a crankcase separated into a crank chamber and an oil reservoir by a partition wall. The partition wall has an opening provided with a wire net for covering the opening. A coil spring is suspended within the oil reservoir so as to form a U-shape. During operation, an engine vibration induces a vibration of the coil spring, and the oscillating coil spring agitates and/or splashes up an engine oil contained in the oil reservoir, and whereby an entire oil surface is ruffled. The engine oil introduced into the crank chamber impinges on a crankshaft and finer droplets or oil mist is formed to thereby lubricate the crankshaft and other engine components.

9 Claims, 18 Drawing Sheets

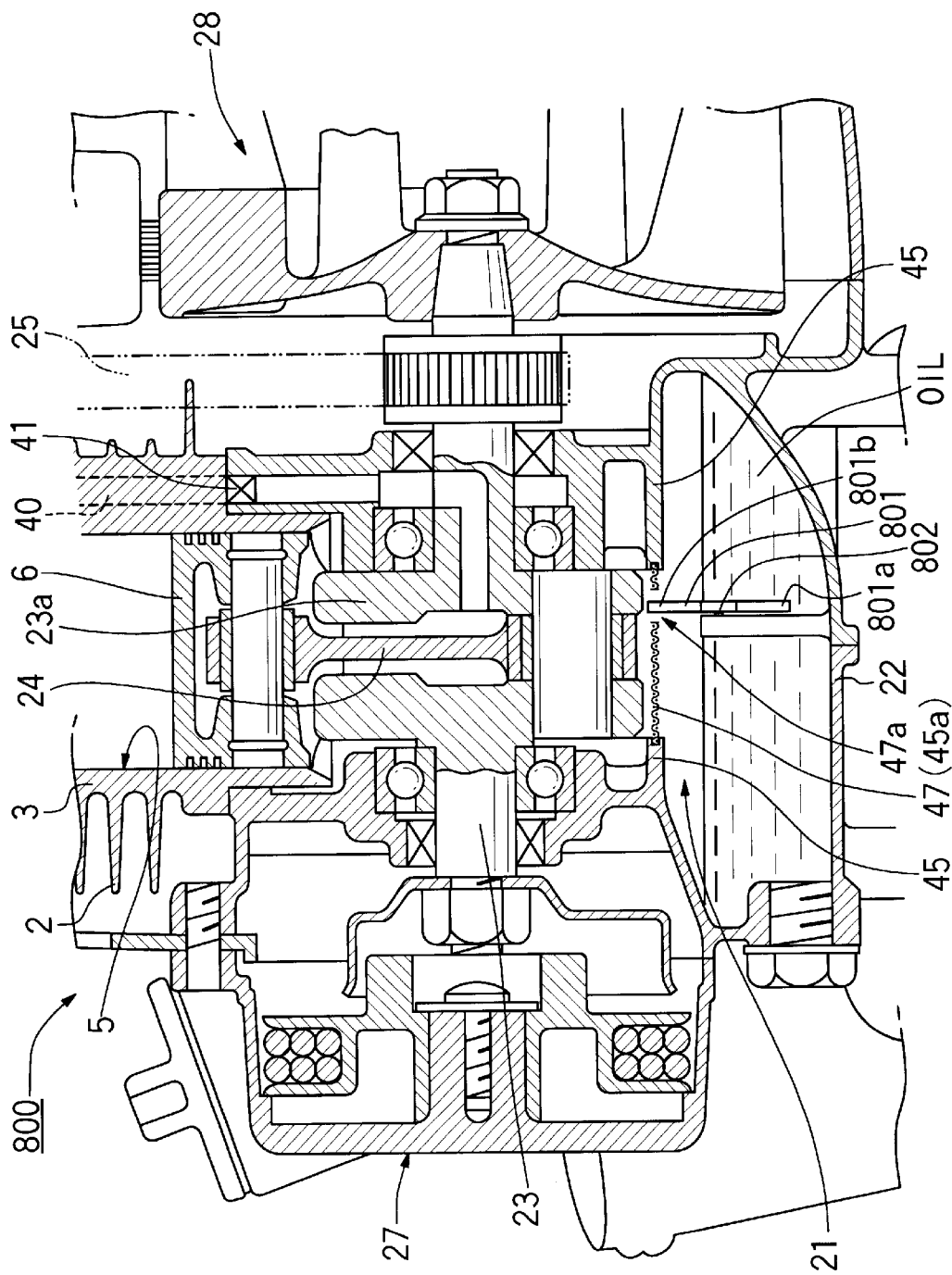

LUBRICATING METHOD AND DEVICE OF INTERNAL COMBUSTION ENGINE

BACKGROUND OF THE INVENTION

The present invention relates to a lubricating method and a lubrication device for an internal combustion engine, and in particular, though not limited thereto, to a method and a device suitable for lubricating an engine used as a power source for compact working machines such as a portable trimmer, a lawn mower, a chain saw or the like.

DESCRIPTION OF THE PRIOR ART

A portable type working machine represented by a trimmer and a chain saw is required to allow an operator to work without any restriction on his working posture. Accordingly, an internal combustion engine mounted on such working machines as a power source is required to constantly provide a stable operation even if the machine is used in a working posture of, for example, laterally tilted position.

In order to meet this requirement, a compact air-cooled type two stroke cycle gasoline engine (hereafter, the "two stroke cycle engine") has been conventionally used. Such a two stroke cycle engine uses a mixed fuel composed of a fuel and a lubricant oil which is mixed in a certain ratio. However, the two stroke cycle engine has some disadvantages in that it is difficult to take an effective purifying measure against the exhaust gas or an emission gas. This is because the two stroke cycle engine generates an exhaust gas containing a large amount of unburned gas constituent due to a gas-flow type scavenging system employed therein.

As for the purifying measures against the emission gas, a four stroke cycle internal combustion engine (Otto engine, hereinafter, the "four stroke cycle engine") has an advantage over the two stroke cycle engine because it generates a small amount of unburned gas. Therefore, the four stroke cycle engine is considered to be employed also in the portable working machines in place of the two stroke cycle engine. The four stroke cycle engine typically has an oil reservoir formed by an oil pan disposed in a bottom portion of a crank chamber, so that a lubricating oil contained in the oil reservoir is pumped up by a pump and/or is splashed up by a rotary member, typically, an oil dipper.

A lubricating system using an oil pump, however, is not suitable for portable working machines since an additional mechanism for discharging and recovering the lubricating oil has to be employed. Therefore, the system tends to be complicated and heavy. In addition, a lubricating system using an oil dipper has a shortcoming in that it is troublesome to determine a length of the oil dipper in an engine design process. That is, if the length of the oil dipper is too short, a desired amount of oil lubrication may not be supplied by the oil dipper after a short period of time when the oil is consumed. On the contrary, if the length of the oil dipper is too long, a large amount of oil may be splashed up by the oil dipper right after the oil has been filled into the oil pan and oil mist generated in the crank chamber shall be too rich, i.e., an excessive amount of oil shall be supplied. Such an event might cause a problem of contamination by a blow-by gas.

SUMMARY OF THE INVENTION

The present invention is made in the process of a technology developing activity for improving the lubricating system by the oil dipper in response to a current environmental and social request surrounding the engine for portable working machines.

Accordingly, an object of the present invention is to provide an improved lubricating method and device for an internal combustion engine which are an improvement from those in the prior art.

Another object of the present invention is to provide an improved lubricating method and device for an internal combustion engine which allow the engine to be lubricated by taking advantage of engine vibration without using an additional power source.

Yet another object of the present invention is to provide a lubricating device for an internal combustion engine which allows an amount of oil mist to be easily controlled.

The object of the present invention described is accomplished by a method for lubricating an internal combustion engine which includes ruffling an engine oil stored in an oil reservoir located adjacent to a crank chamber to introduce the engine oil into the crank chamber; and impinging a crankshaft provided in the crank chamber on the engine oil to form oil mist.

Further, the object of the present invention described is also accomplished by a lubrication device for an internal combustion engine and includes: a crank chamber; a crankshaft accommodated within the crank chamber; an oil reservoir arranged adjacent to the crank chamber; an engine oil accommodated within the oil reservoir; and a spring member arranged within the oil reservoir so as to be oscillated by an engine vibration.

Further, in an preferred embodiment of the present invention, an engine vibration device is employed to oscillate a spring member to agitate the engine oil in the oil reservoir to splash it up and/or to ruffle its oil surface so as to introduce the engine oil into the crank chamber. A rotating crank shaft impinges on the engine oil within the crank chamber to be formed into fine oil droplets.

A coil spring or a leaf spring may be employed as the spring member. This spring member may be selected based on its natural frequency so as to resonate with, for example, an engine vibration during idle running.

The crank chamber and the oil reservoir may be separated from each other by a partition wall having an opening formed therein and equipped with a net member covering the opening. The net member may control an amount of engine oil to be introduced into the crank chamber allowing an appropriate amount of oil mist to be held in the crank chamber.

Other objects and an action and effect of the present invention will be made obvious by the description of the preferred embodiments of the present invention shown below.

BRIEF DESCRIPTION OF THE DRAWINGS

FIG. 18 is a longitudinal cross-sectional view taken along the crankshaft, illustrating a lower portion of the engine in accordance with the eighth embodiment shown in FIG. 17.

DESCRIPTION OF THE PREFERRED EMBODIMENTS

Figure 1:
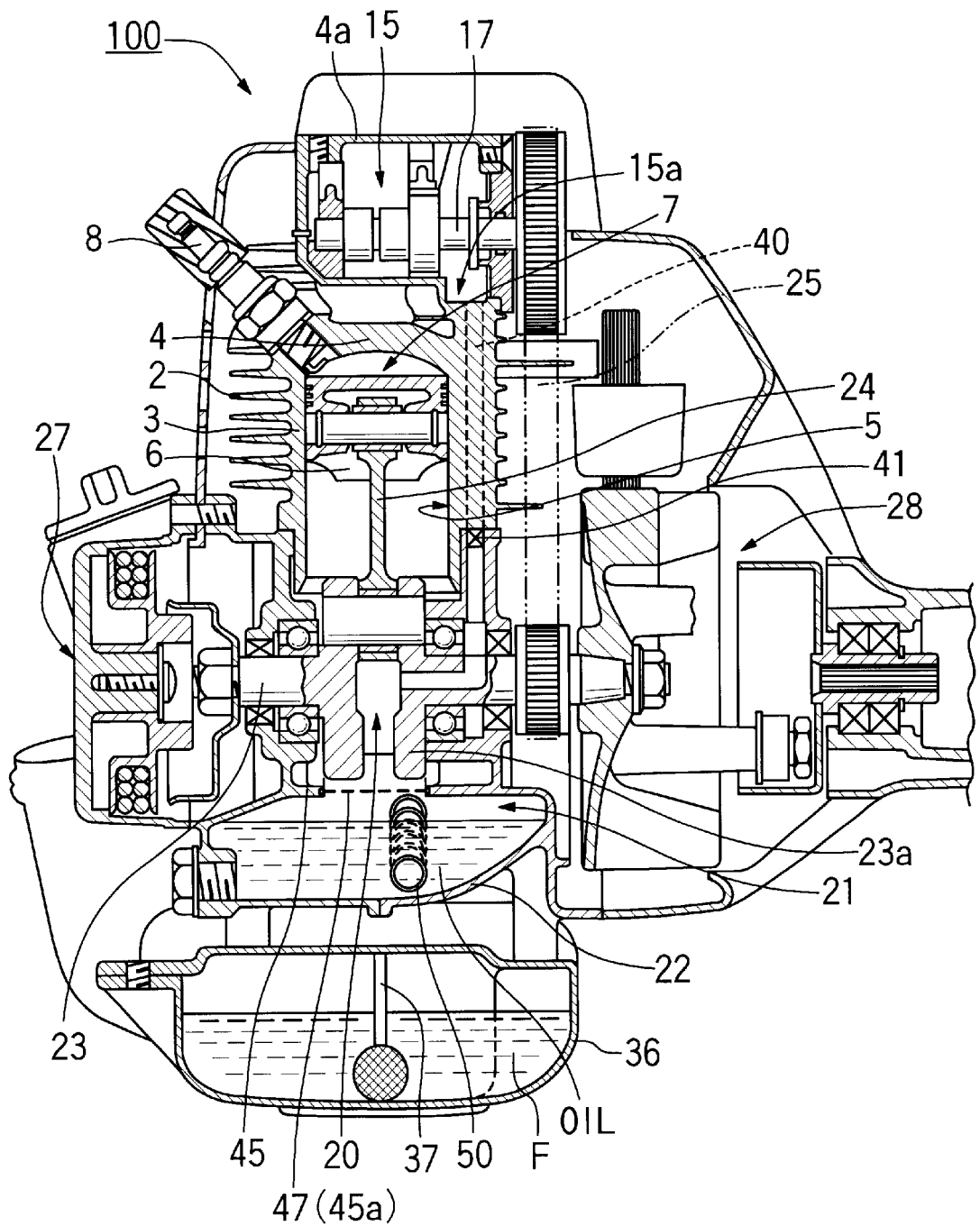
FIG. 1 is a longitudinal cross-sectional view taken along an axial line of a crankshaft, illustrating an engine in accordance with a first embodiment of the present invention.

Preferred embodiments of the present invention will now be described in detail with reference to the attached drawings.

The engine 100 shown in FIGS. 1 to 4 is of a relatively compact type with a displacement of about 20 to 60 mL, which may be employed, for example, as a power source for a grass trimmer. The engine 100 comprises a cylinder block 3 having a cooling fin 2 formed thereon for air-cooling. A cylinder head 4 integrally formed on the cylinder block 3. A combustion chamber 7 is defined and formed by and between the cylinder head 4 and a piston 6 fittingly inserted into a cylinder bore 5 formed in the cylinder block 3 for reciprocating movement in the combustion chamber 7.

Figure 2:
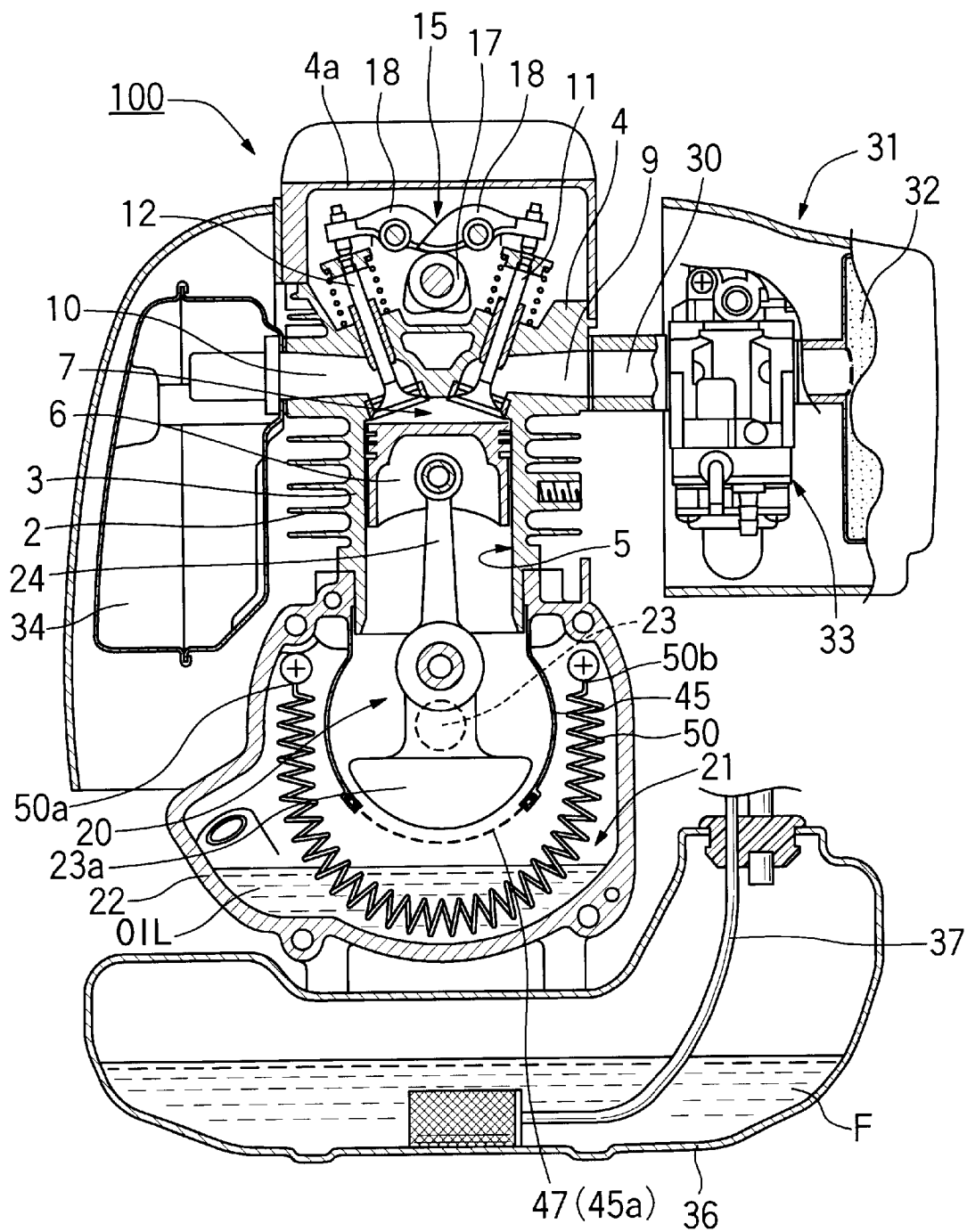
FIG. 2 is another longitudinal cross-sectional view taken along a direction crossing the crankshaft at right angles, illustrating the same engine shown in FIG. 1.

As illustrated in FIGS. 1 and 2 the cylinder head 4 is equipped with an ignition plug 8 mounted to face the combustion chamber 7, and an intake port 9 and an exhaust port 10, each of which opens to the combustion chamber 7. The intake port 9 is opened and closed by an intake valve 11 while the exhaust port 10 is opened and closed by an exhaust valve 12.

The engine 100 further includes a valve chamber 15 for accommodating a valve mechanism, defined by the cylinder head 4 and a head cover 4a mounted above the cylinder head 4. As shown in FIG. 2, the valve mechanism includes, as conventionally well known, a camshaft 17, and a rocker arm 18 or the like. As can be seen therefrom, the engine 100 is a so-called OHC type engine.

A crankcase 22 is attached to a lower end of the cylinder block 3 to form a crank chamber 20 and an oil reservoir 21 for storing an engine oil (OIL), wherein an engine power take-off shaft or a crankshaft 23 arranged in the crank chamber 20 is connected with the piston 6 via a connecting rod 24. The crank chamber 20 and the oil reservoir 21 will be described in detail later. The crankshaft 23 is operatively connected to the camshaft 17 via a timing belt 25 (FIG. 1), so that the intake valve 11 and the exhaust valve 12 are opened and closed in a predetermined timing in synchronization with the rotation of the crankshaft 23.

Figure 3:
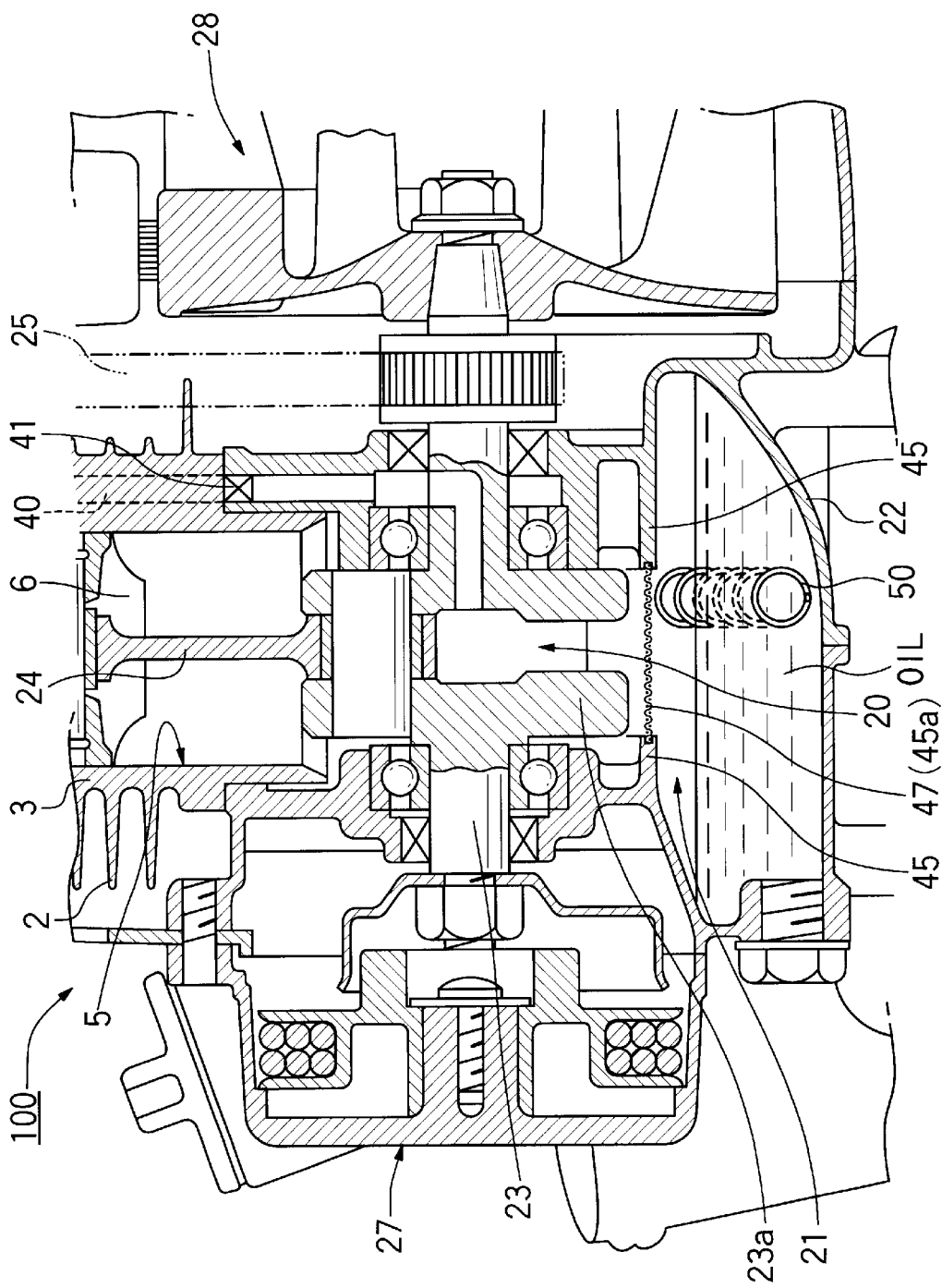
FIG. 3 is an enlarged longitudinal cross-sectional view of a lower portion of the engine shown in FIG. 1.
Figure 4:
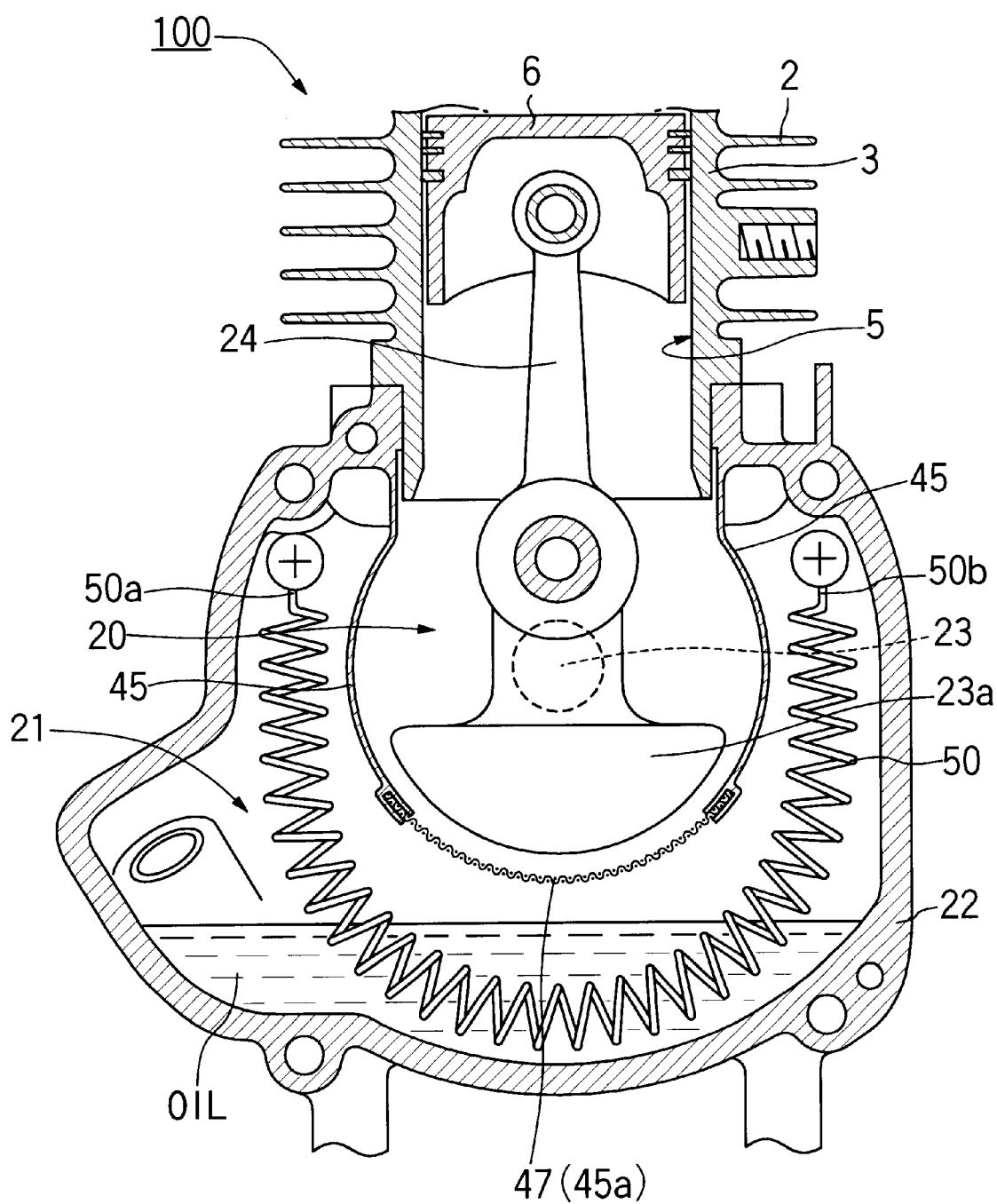
FIG. 4 is an enlarged longitudinal cross-sectional view of a lower portion of the engine shown in FIG. 2.

Reference numeral 27 in FIGS. 1 and 3 designates a recoil starter, which is operatively engaged with the crankshaft 23. The engine 100 is actuated by manually operating the recoil starter 27. Reference numeral 28 (FIG. 1) is a centrifugal clutch, which outputs a rotary driving force of the crankshaft 23 to a cutting blade device (not shown).

As shown in FIG. 2, an intake system component 31 is connected to the intake port 9 to form an intake channel 30 communicating therewith. The intake system component 31 includes an air cleaner 32, and a diaphragm type carburetor 33 which serves as a fuel supply device for the engine 100 and includes a throttle valve (not shown). In addition, the engine 100 includes an exhaust system component 34 in fluid connection with the exhaust port 10.

A fuel tank 36 containing gasoline fuel F is arranged below the engine 100 and adjacent to the crankcase 22. The fuel F contained in the fuel tank 36 is supplied to the carburetor 33 through piping 37 to be atomized thereby. The fuel F is subsequently sent through the intake channel 30 and the intake port 9 to charge the combustion chamber 7.

The engine 100 further includes a plurality of communicating channels 40 for fluidicelly connecting the crank chamber 20 to the valve chamber 15. The plurality of communicating channels 40 is provided with a plurality of through holes arranged to extend through a wall of the cylinder block 3 along a vertical direction, and, for example, four through holes are arranged in the cylinder block 3 placing a certain distance therebetween along a circular direction. The communicating channel 40 shown in FIGS. 1 and 3 includes, different from other communicating channels (not shown), a top end opening to a recess 15a formed on a bottom wall of the valve chamber 15 (FIG. 1), and a check valve 41 is arranged in a bottom end of the communicating channel 40. The check valve 41 is installed to allow a fluid flow from the valve chamber 15 to the crank chamber 20, and to inhibit fluid flow in a reverse direction so that circulation of the fluid is properly maintained, and accordingly can be omitted in some cases.

Regarding the crank chamber 20 and the oil reservoir 21 mentioned above, a space in the crankcase 22 is separated by a partition wall 45 into the crank chamber 20 and the oil reservoir 21. The partition wall 45 is formed into an arc shape extending about a rotation axis of the crankshaft 23, and extends along a locus of movement of a balancing weight 23a of the crankshaft 23. Thus, the partition wall 45 forms a U-shaped oil reservoir 21 which surrounds the crank chamber 20. The partition wall 45 has an opening 45a at a bottom portion thereof, and a net member or a wire net 47 made of stainless steel wire or the like is attached to cover the opening 45a. A coil spring 50 is arranged in the oil reservoir 21. The coil spring 50 is held at respective ends 50a, 50b thereof at a right and a left top end portion of the crankcase 22 so as to extend throughout the entire region of the U-shaped oil reservoir 21. Thus, the coil spring 50 is arranged in the oil reservoir 21 to be suspended in a U-shape.

The engine 100 constructed as described above is operated in the same manner as a conventional four stroke cycle internal combustion engine repeating a series of strokes including an intake stroke, a compression stroke, an expansion stroke and an exhaust stroke, which makes the upward and downward motions of the piston 6 to generate a pressure variation in the crank chamber 20, which in turn results in fluid circulation between the crank chamber 20 and the valve chamber 15 through the communicating channel 40.

An engine vibration caused by the operation of the engine 100 induces an oscillation of the coil spring 50 in the oil reservoir 21. The oscillating coil spring 50 agitates the engine oil (OIL) in the oil reservoir 21 and/or splashes it up, and ruffles an entire oil surface. Since the coil spring 50 is arranged throughout the entire region of the U-shaped oil reservoir 21 which surrounds the crank chamber 20, the oscillating coil spring 50 agitates the engine oil (OIL) in the oil reservoir 21 and/or splash it up, and ruffles the entire oil surface even if the engine 100 is operated under, for example, a horizontally tilted condition or an upside-down condition.

Fine droplets of the engine oil entering into the crank chamber 20 through the opening 45a on the partition wall 45 impinge on the rotating crankshaft 23, thereby generating finer droplets or oil mist to lubricate the crankshaft 23, etc. The oil mist in the crank chamber 20 is introduced into the valve chamber 15 by the circulation described above to lubricate the valve mechanism therein and then is circulated from the valve chamber 15 back to the oil reservoir 21 through the crank chamber 20.

It has been confirmed through experimental testing of the prototype model of the engine 100 constructed as described above that an excellent lubricating effect is provided. Further, another advantage is that soot contained in an exhaust gas is sufficiently reduced. As a result of comparative analysis between a case where the wire net 47 is installed over the opening 45a and another case where the wire net 47 is removed therefrom, it is confirmed that the former case allows the amount of the oil mist in the crank chamber 20 to be kept in an appropriate level. That is, it is confirmed that installing means for controlling the amount of oil introduced into the crank chamber 20 from the oil reservoir 21, or the wire net 47 suppresses to generate excessive oil mist in the crank chamber 20 and keeps it in an appropriate level therein.

Figure 5:
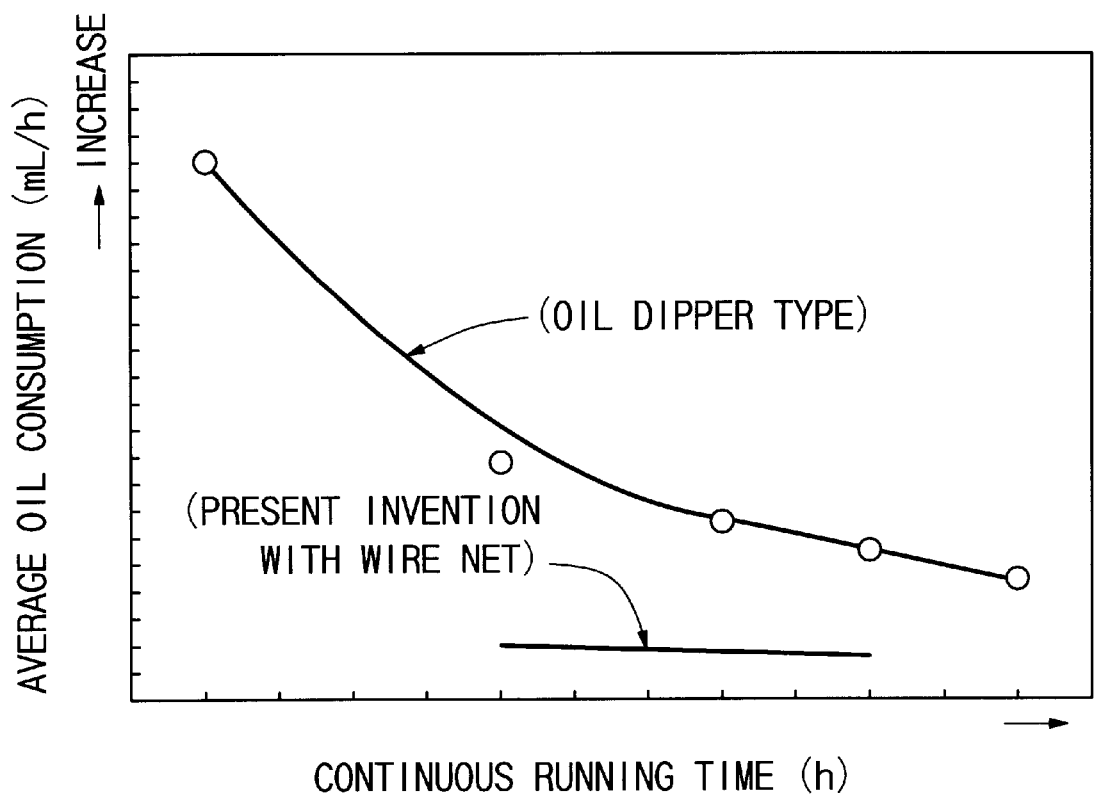
FIG. 5 is a diagram illustrating a test results comparing an effect of the present invention having a wire net arranged between a crank chamber and the oil reservoir with that of a conventional system.

For example, a characteristic comparison between the lubricating system according to the present invention and a conventional system using only an oil dipper is shown in FIG. 5. As can be seen from FIG. 5, a change in a oil consumption rate over time is extremely small when the wire net 47 is installed. The wire net 47 may also provide an equivalent effect when used in combination with the conventional dipper. Accordingly, the effect of the wire net 47 is not limited to the lubricating system where it is used in combination with the coil spring 50.

A mesh size of the wire net 47 or a size of opening on the wire net 47 depends upon the displacement of the engine 100, the appropriate volume of the engine oil, and the shape of the oil reservoir 21 or the like. For an engine with a displacement of about 20 to 60 mL, the wire net 47 may be selected so as to have the proper mesh size and an appropriate area of the opening 45a such that the amount of oil passing therethrough may be controlled to be within the range of about 0.5 to 3.0 mL/hr.

Figure 6:
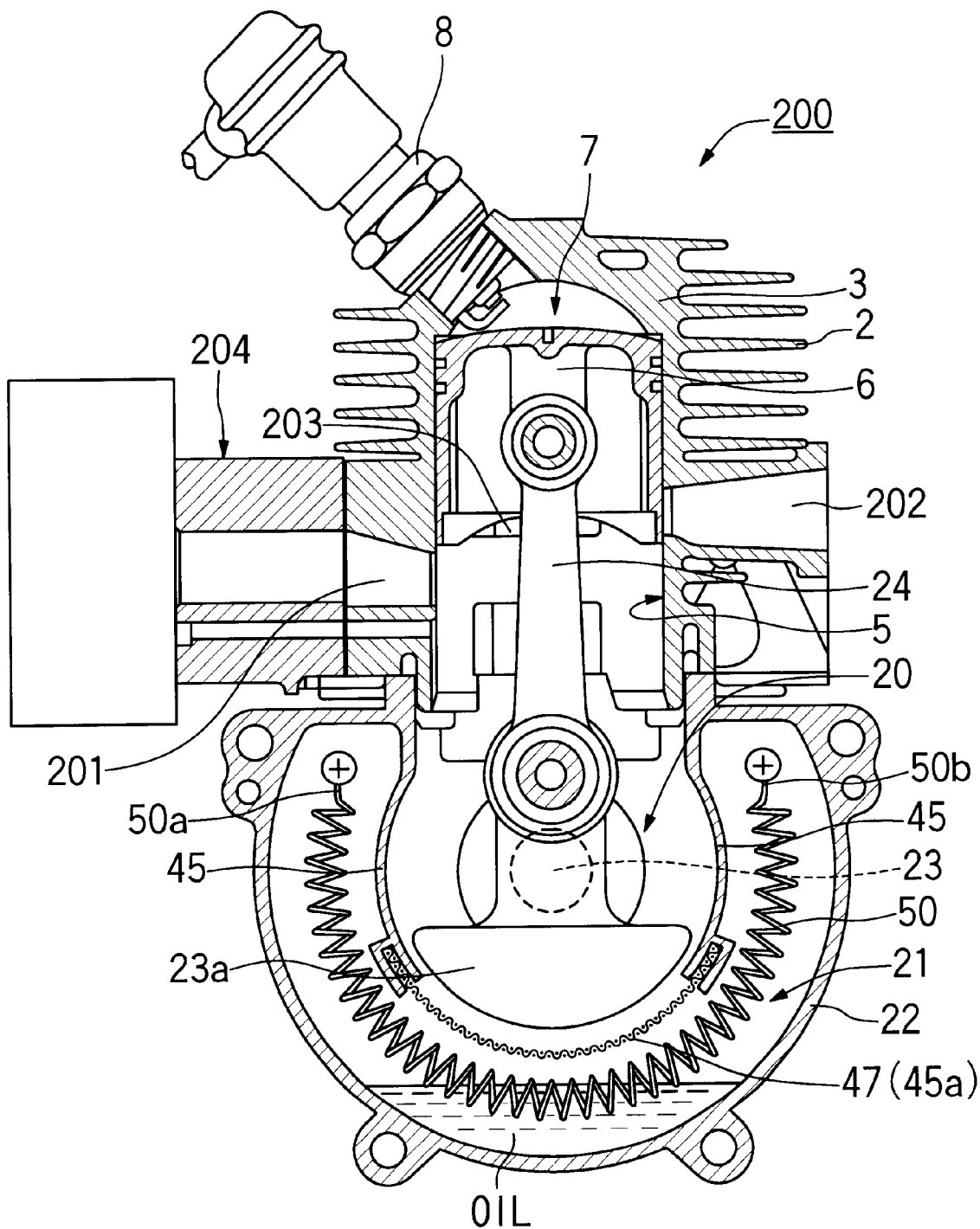
FIG. 6 is a longitudinal cross-sectional view take along a direction crossing a crankshaft at right angles, illustrating an engine in accordance with a second embodiment of the present invention.

The drawings on and after FIG. 6 show alternative embodiments of the present invention, and in the description of these embodiments the components equivalent to those of the first embodiment described above will be designated by the same reference numerals as in the first embodiment and the description therefor is omitted. Only the features thereof will be described.

Figure 7:
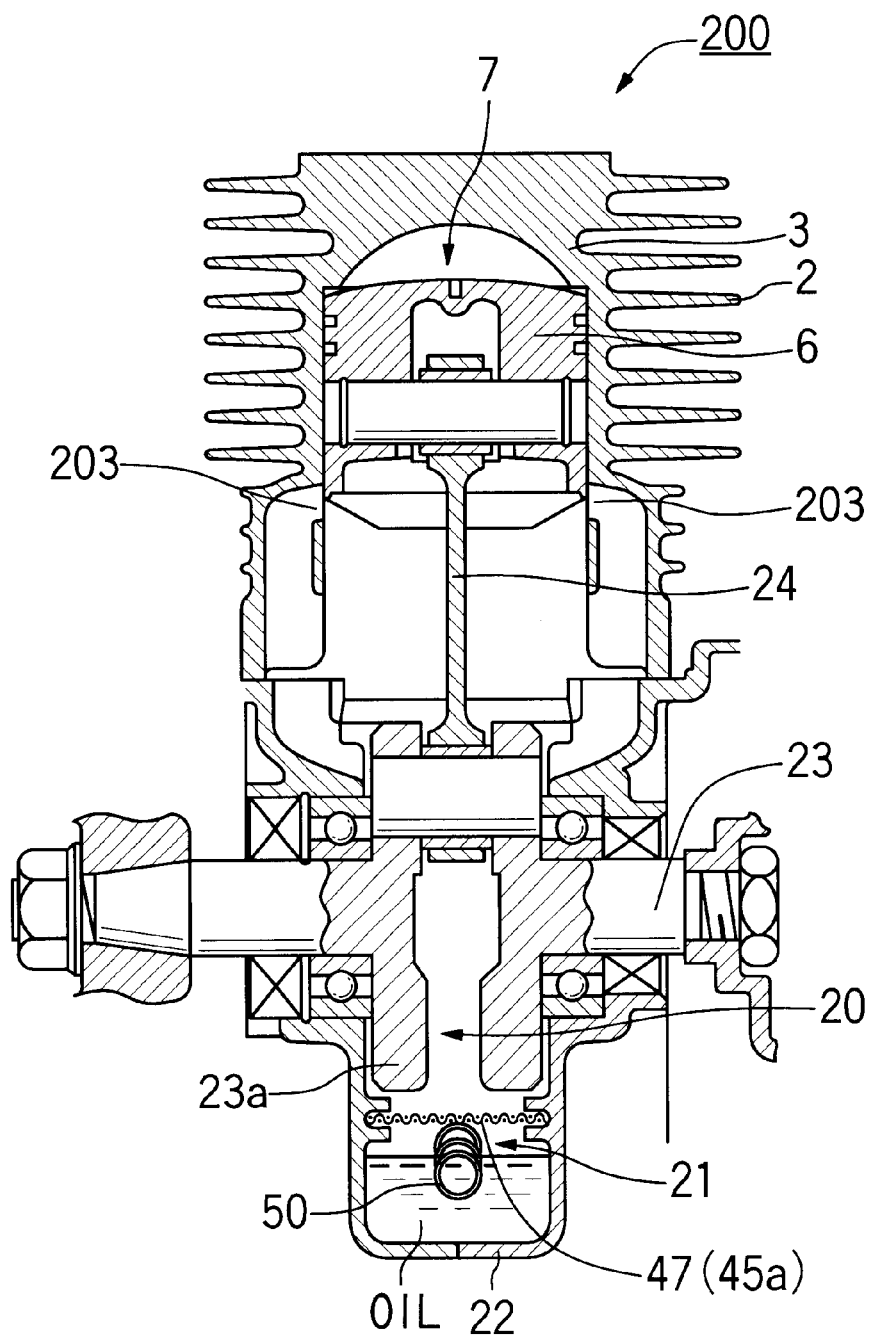
FIG. 7 is another longitudinal cross-sectional view taken along the crankshaft, illustrating the engine shown in FIG. 6.

FIGS. 6 and 7 show a second embodiment of the present invention, including an engine 200 of a relatively compact type with a displacement of about 20 to 60 mL, and which may be employed, for example, as a power source for a grass trimmer. The engine 200 is a conventional two stroke cycle internal combustion engine including a cylinder block 3 having an inlet port 201, an exhaust port 202 and a scavenging port 203 each formed thereon. A crankcase 22 of the same type with that of the first embodiment described above is attached to a bottom of the cylinder block 3, and a crank chamber 20 and a U-shaped oil reservoir 21 arranged surrounding the crank chamber 20 are defined and separated by a partition wall 45. Further, the partition wall 45 has an opening 45a at a bottom thereof, and a wire net 47 described above is attached to cover the opening 45a.

A coil spring 50 as described above is arranged in the oil reservoir 21 and is held at respective ends 50a, 50b thereof at respective top end portions of the crankcase 22 so as to extend throughout the entire region of the U-shaped oil reservoir 21. That is, the coil spring 50 is arranged in the oil reservoir 21 to be suspended into a U-shape as in the first embodiment. An intake system component 204 including a carburetor and the like is connected to the intake port 201 of the two stroke cycle internal combustion engine 200, and gasoline is used as a fuel (without lubricating oil) and is supplied from the intake system component 204 to the intake port 201.

The two stroke cycle engine 200 of the second embodiment, operates similarly to the four stroke cycle engine 100 of the first embodiment in that the oscillating coil spring 50 vibrated by the engine vibration agitates the engine oil (OIL) in the oil reservoir 21 and/or splashes it up, and ruffles the entire oil surface. The rotating crank shaft 23 impinges on the engine oil entering into the crank chamber 20 through the wire net 47 and finer droplets or oil mist is generated to lubricate the crankshaft 23, etc.

Figure 8:
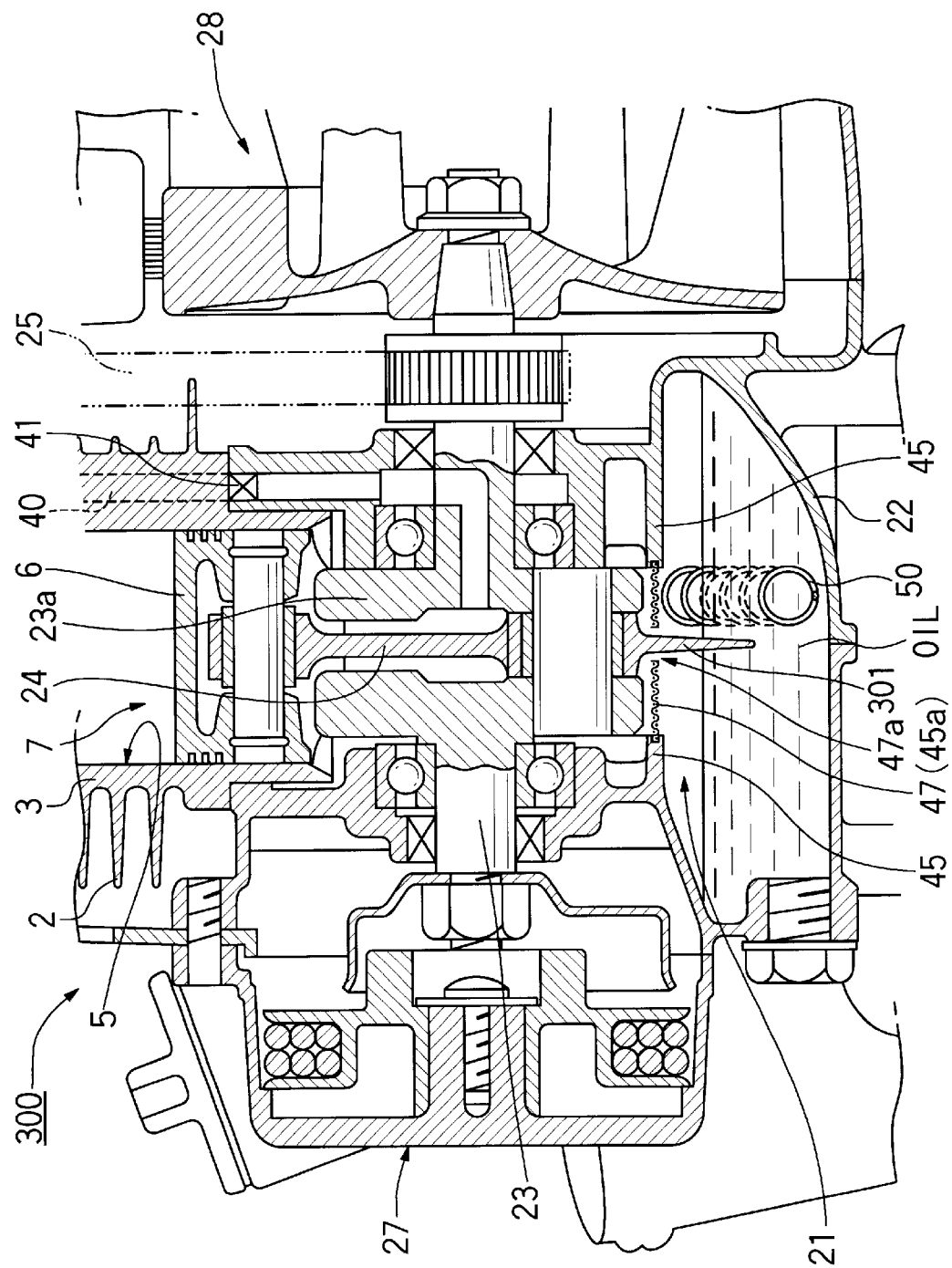
FIG. 8 is a longitudinal cross-sectional view taken along an axial line of a crankshaft, illustrating a lower portion of an engine in accordance with a third embodiment of the present invention.

FIG. 8 shows a third embodiment of the present invention, including an engine 300 that is a modification of the engine 100 of the first embodiment described above. The four stroke cycle internal combustion engine 300 of the third embodiment has an oil dipper 301, and is lubricated by the use of the oil dipper 301 in combination with the coil spring 50 described above. Reference numeral 47a shown in FIG. 8 is an opening formed on the wire net 47. The oil dipper 301 extends into the oil reservoir 21 through the opening 47a to splash up the engine oil (OIL). The lubrication system employing the oil dipper 301 in combination with the coil spring 50 can be applied also to the two stroke cycle engine 200 of the second embodiment.

According to the engine 300 of the third embodiment shown in FIG. 8, a desired level of lubrication effect can be provided by the coil spring 50 even when the oil dipper 301 no longer reaches the engine oil in the oil reservoir 21 due to consumption thereof.

Figure 9:
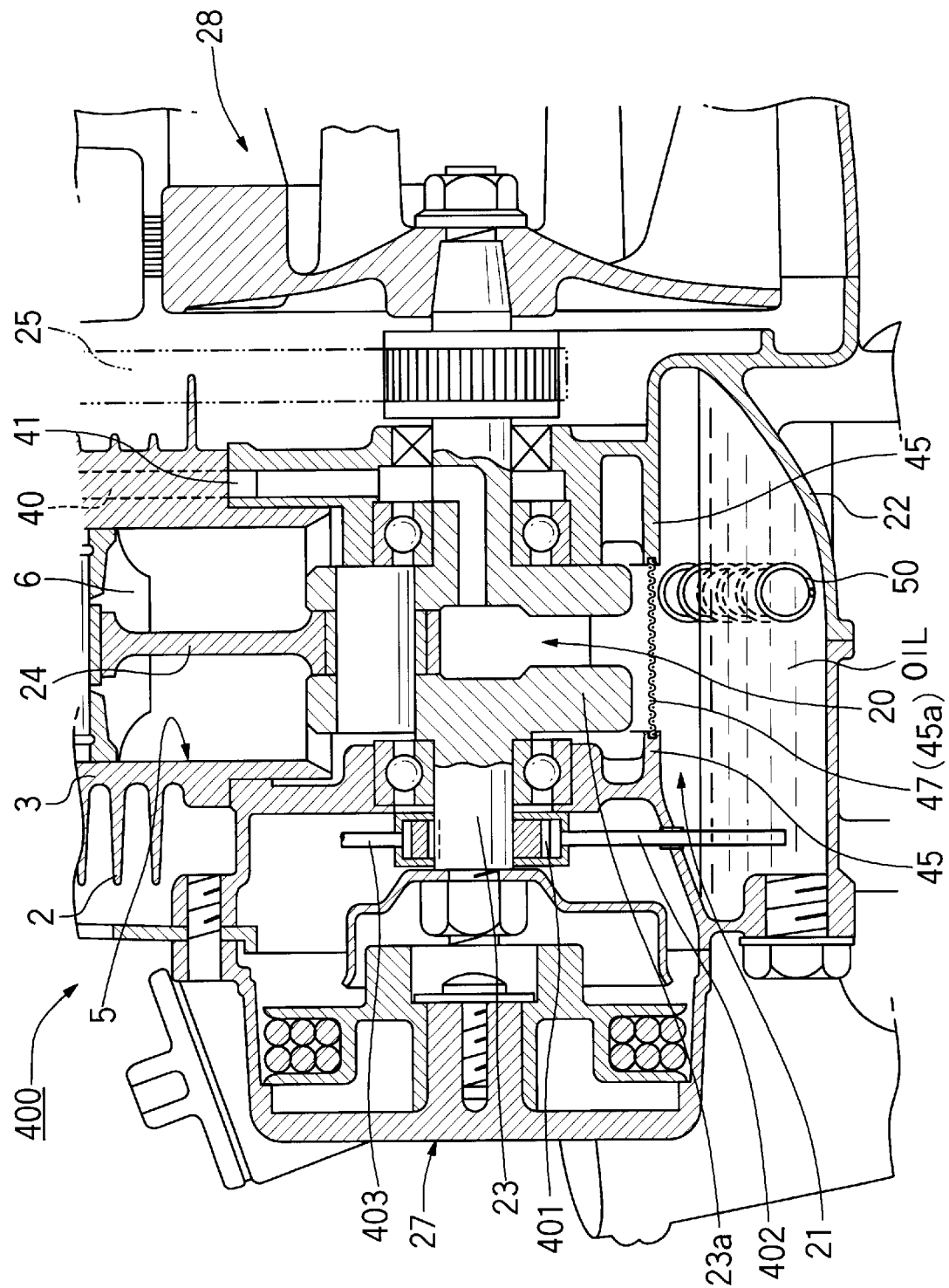
FIG. 9 is a longitudinal cross-sectional view taken along an axial line of a crankshaft, illustrating a lower portion of an engine in accordance with a fourth embodiment of the present invention.

FIG. 9 shows a fourth embodiment of the present invention including an engine 400 that is a modification of the engine 100 of the first embodiment described above. The four stroke cycle internal combustion engine 400 of the fourth embodiment has an oil pump 401 incorporated into the crankshaft 23, an inlet pipe 402 connected to a suction side of the oil pump 401, and an outlet pipe 403 connected to a discharge side of the oil pump 401. The oil pump 401 pumps the engine oil (OIL) in the oil reservoir 21 via the inlet pipe 402 and feeds it by pressure into the valve chamber 15 via the outlet pipe 403. That is, according to the engine 400 of the fourth embodiment, the valve mechanism in the valve chamber 15 is force-lubricated by the oil sent from the oil pump 401 by pressure, while the lubrication in the crank chamber 20 is conducted by the operation of the coil spring 50.

Figure 10:
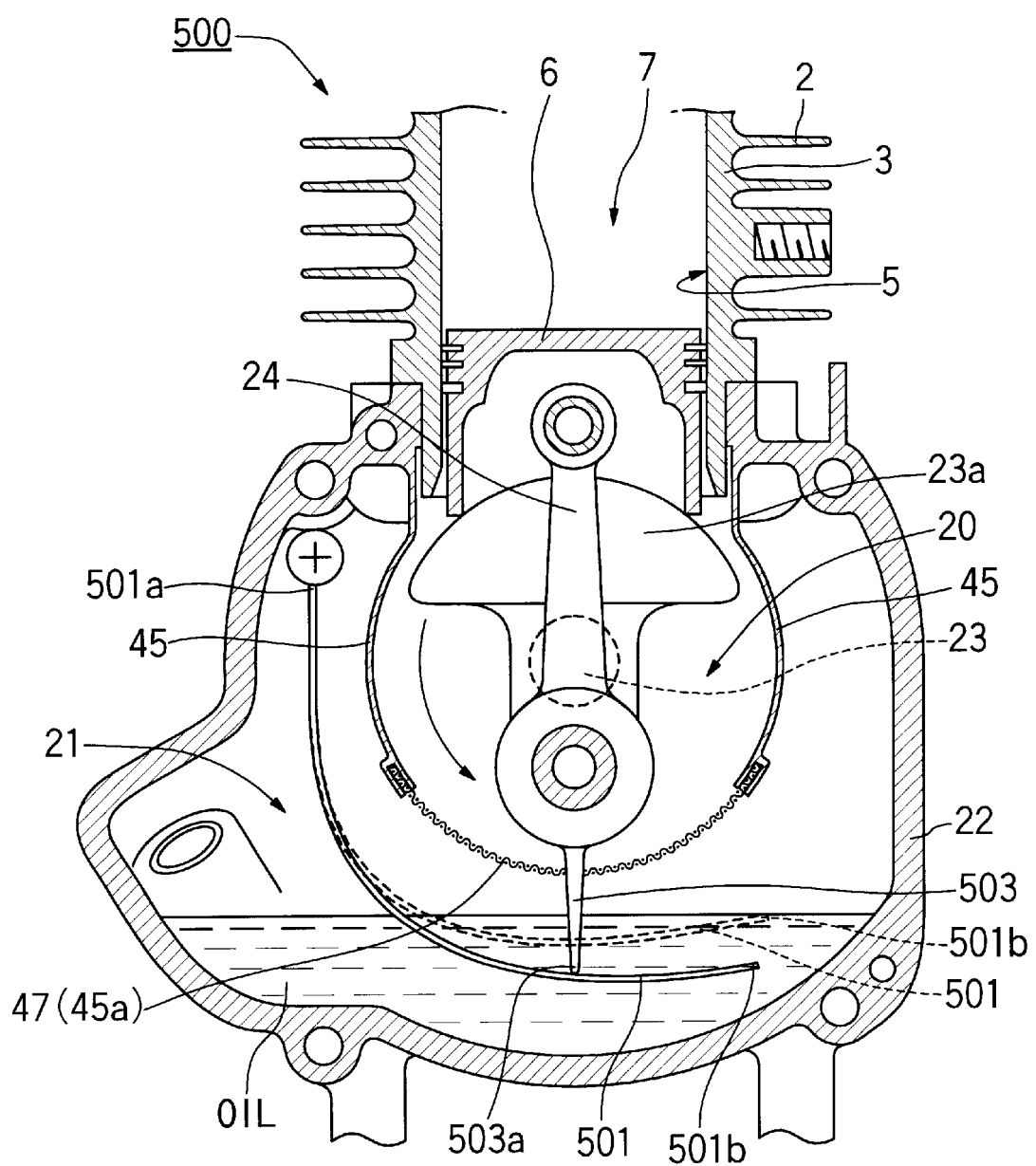
FIG. 10 is a longitudinal cross-sectional view taken along a direction crossing a crankshaft at right angles, illustrating a lower portion of an engine in accordance with a fifth embodiment of the present invention.
Figure 11:
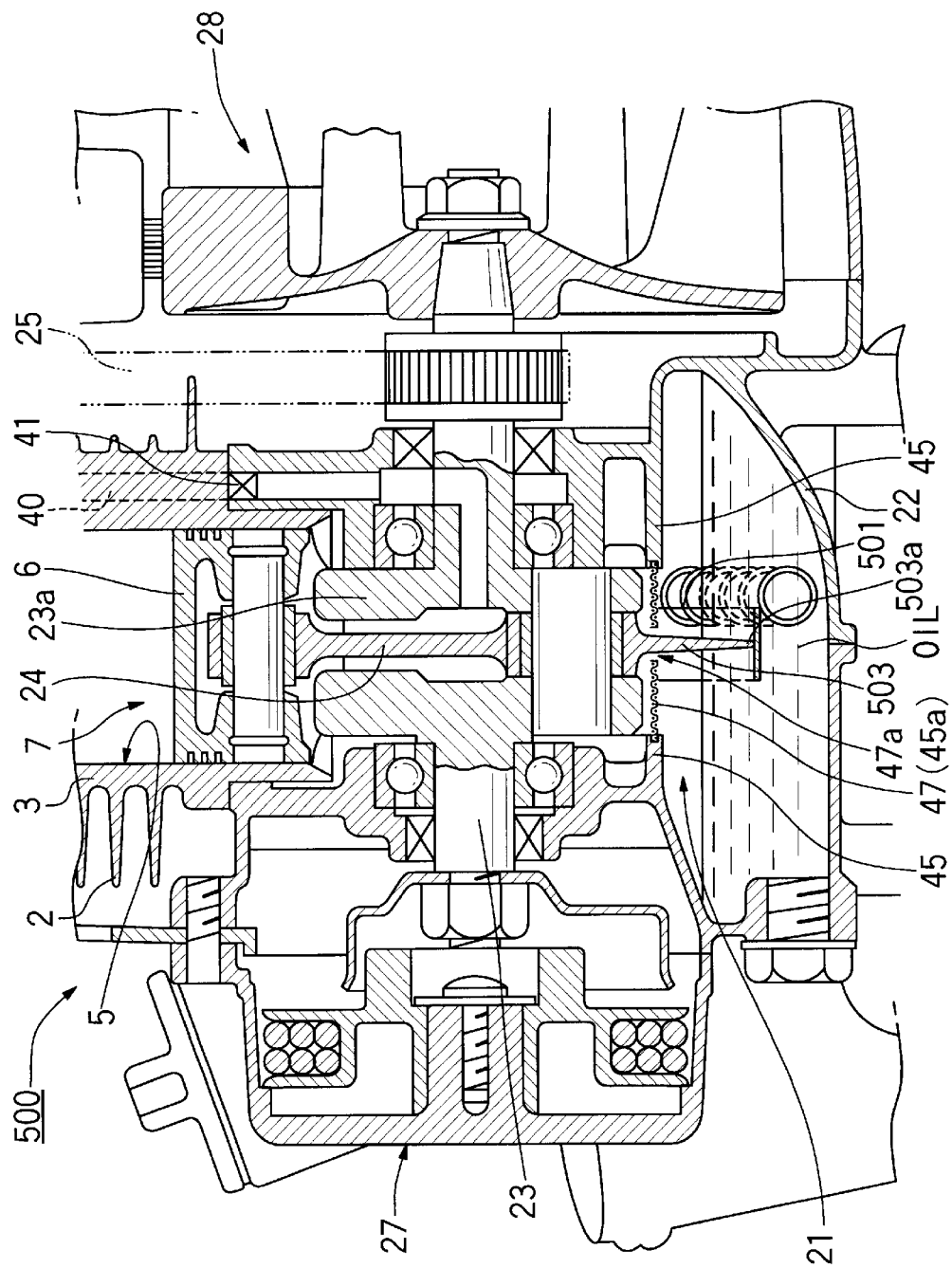
FIG. 11 is a longitudinal cross-sectional view taken along the crankshaft, illustrating a lower portion of the engine in accordance with the fifth embodiment shown in FIG. 10.

FIGS. 10 and 11 show an engine 500 of the fifth embodiment. Though the engine 500 is a four-stroke cycle internal combustion engine similar to the engine 100 of the first embodiment, it can also be a two stroke cycle engine. The engine 500 has a leaf spring 501 arranged in the oil reservoir 21, wherein the leaf spring 501 is secured at one end 501a thereof to one top end portion of the oil reservoir 21 as a cantilever and extends under the crankshaft 23 to reach to the other side of the oil reservoir 21. A free end 501b of the leaf spring 501 is immersed in the engine oil (OIL) in the oil reservoir 21 when the engine 500 is in its upright position as shown in the drawings. Two leaf springs 501 may be employed so that the second one is secured to the other top end portion of the oil reservoir 21.

In the engine 500 of the fifth embodiment, the leaf spring 501 is vibrated by the engine vibration at the free end 501b thereof. As in the coil spring 50 of the engine 100 of the first embodiment the vibration of the leaf spring 501 agitates the engine oil (OIL) in the oil reservoir 21 and/or splashes it up, and ruffles the entire oil surface. The engine oil entering into the crank chamber 20 is impinged on the rotating crankshaft 23 and finer droplets or oil mist is generated to thereby lubricate the crankshaft 23, etc. Further, the engine 500 has a contact member 503 radially projecting from the connecting rod 24 as the oil dipper so that a tip 503a of the contact member 503 may come in contact with the free end 501b of the leaf spring 501 to vibrate the leaf spring 501 by force with sufficient amplitude.

Figure 12:
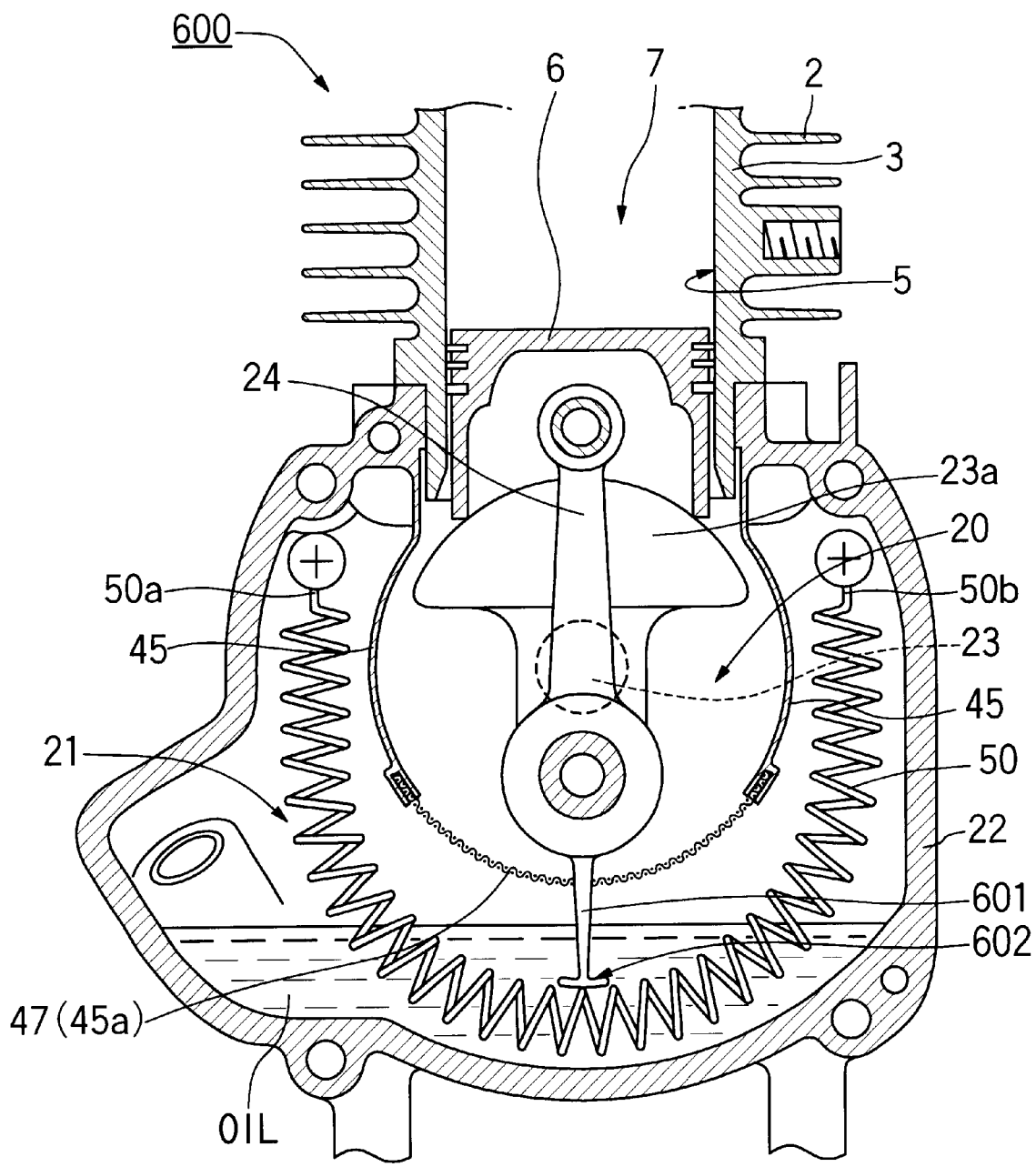
FIG. 12 is a longitudinal cross-sectional view taken along a direction crossing a crankshaft at right angles, illustrating a lower portion of an engine in accordance with a sixth embodiment of the present invention.
Figure 13:
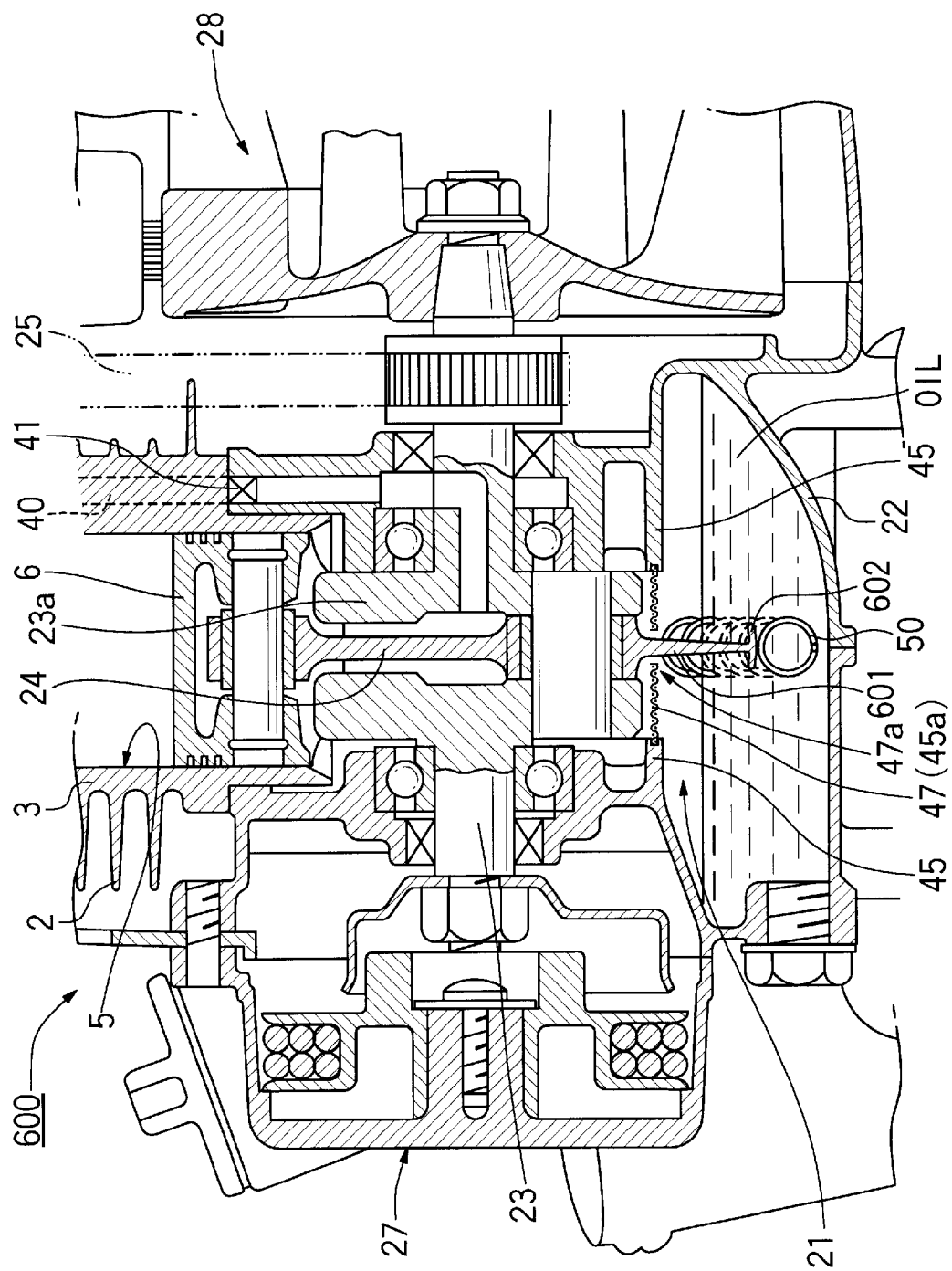
FIG. 13 is a longitudinal cross-sectional view taken along the crankshaft, illustrating a lower portion of the engine in accordance with the sixth embodiment shown in FIG. 12.
Figure 14:
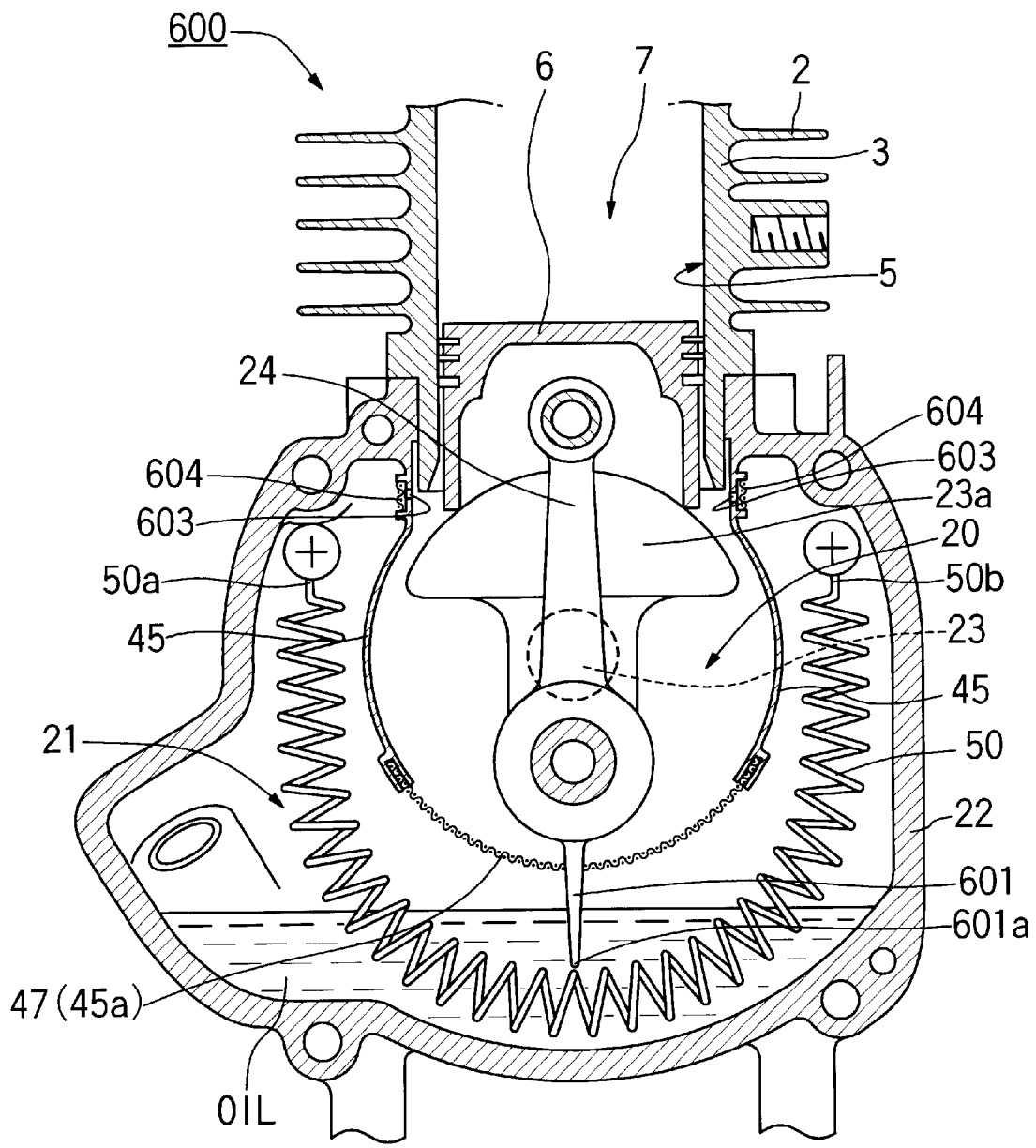
FIG. 14 is a longitudinal cross-sectional view similar to FIG. 12, illustrating a modified embodiment of the sixth embodiment of the present invention.

FIGS. 12 and 13 show an engine 600 of the sixth embodiment and FIG. 14 shows a modification thereof. Though the engine 600 shown in the drawings is a four stroke cycle internal combustion engine similar to the engine 100 of the first embodiment, it can be a two stroke cycle engine as well. In the engine 600 shown in FIG. 12, the coil spring 50 disposed in the U-shape oil reservoir 21 which is suspended therein is vibrated by the engine vibration to agitate the engine oil (OIL) in the oil reservoir 21 and/or to splash it up, and to ruffle the entire oil surface. The engine oil entering into the crank chamber 20 is impinged upon the rotating crankshaft 23 and whereby finer droplets or oil mist is generated to thereby lubricate the crankshaft 23. The engine 600 further has a contact member 601 radially projecting from the connecting rod 24 as in the oil dipper.

The contact member 601 has at a tip thereof an end face 602 extending along a longitudinal direction of a coil spring 50 that is formed into an arc shape extending about a rotational axis of the crankshaft 23. According to the engine 600 of the sixth embodiment, the end face 602 of the contact member 601 comes into contact with the coil spring 50 to forcibly vibrate the coil spring 50 in a sufficient amplitude. Alternatively, the contact member 602 may be formed, as shown in FIG. 14, into a tapered shape so that a tip 601a of the contact member 601 comes into contact with the coil spring 50 to forcibly vibrate it in a sufficient amplitude.

FIG. 14 also shows a modified example of the partition wall 45 for separating the crank chamber 20 and the oil reservoir 21 from each other. In FIG. 14, the partition wall 45 has, in addition to the bottom opening 45a (hereafter, the "first opening"), a pair of second openings 603 each being arranged on an upper end portion, that is, on a left or a right side portion adjacent to the cylinder block 3 respectively, each opening 603 being covered by a second wire net 604 made of the same material as of the wire net 47. Even if the engine 600 is tilted or is put into an upside-down position during operation and thereby the engine oil (OIL) in the oil reservoir 21 flows into an upper end portion of the oil reservoir 21, due to the second wire net 604, the engine oil can be prevented from flowing into the crank chamber 20 at a stroke through the second opening 603.

Figure 15:
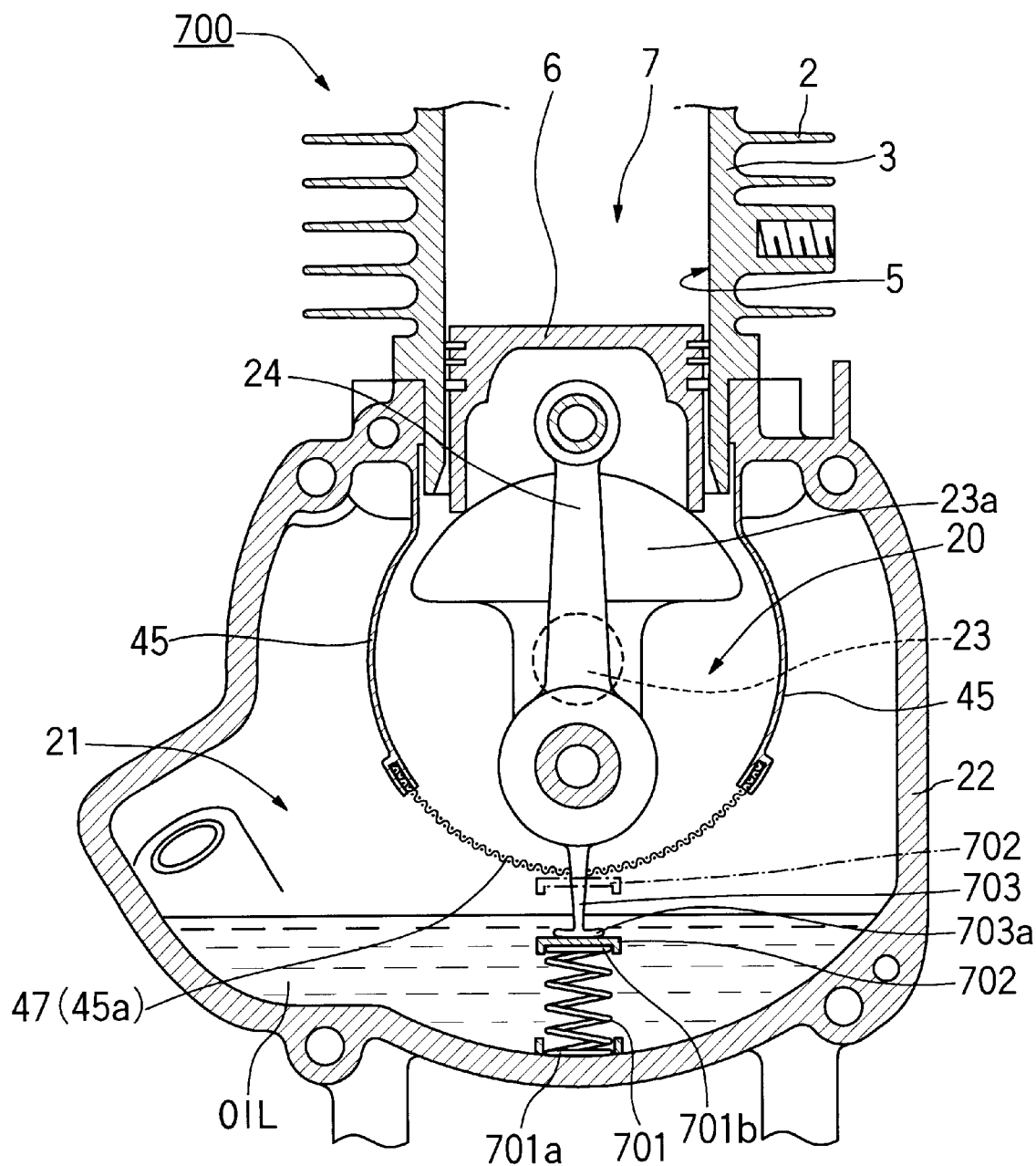
FIG. 15 is a longitudinal cross-sectional view taken along a direction crossing a crankshaft at right angles, illustrating a lower portion of an engine in accordance with a seventh embodiment of the present invention.
Figure 16:
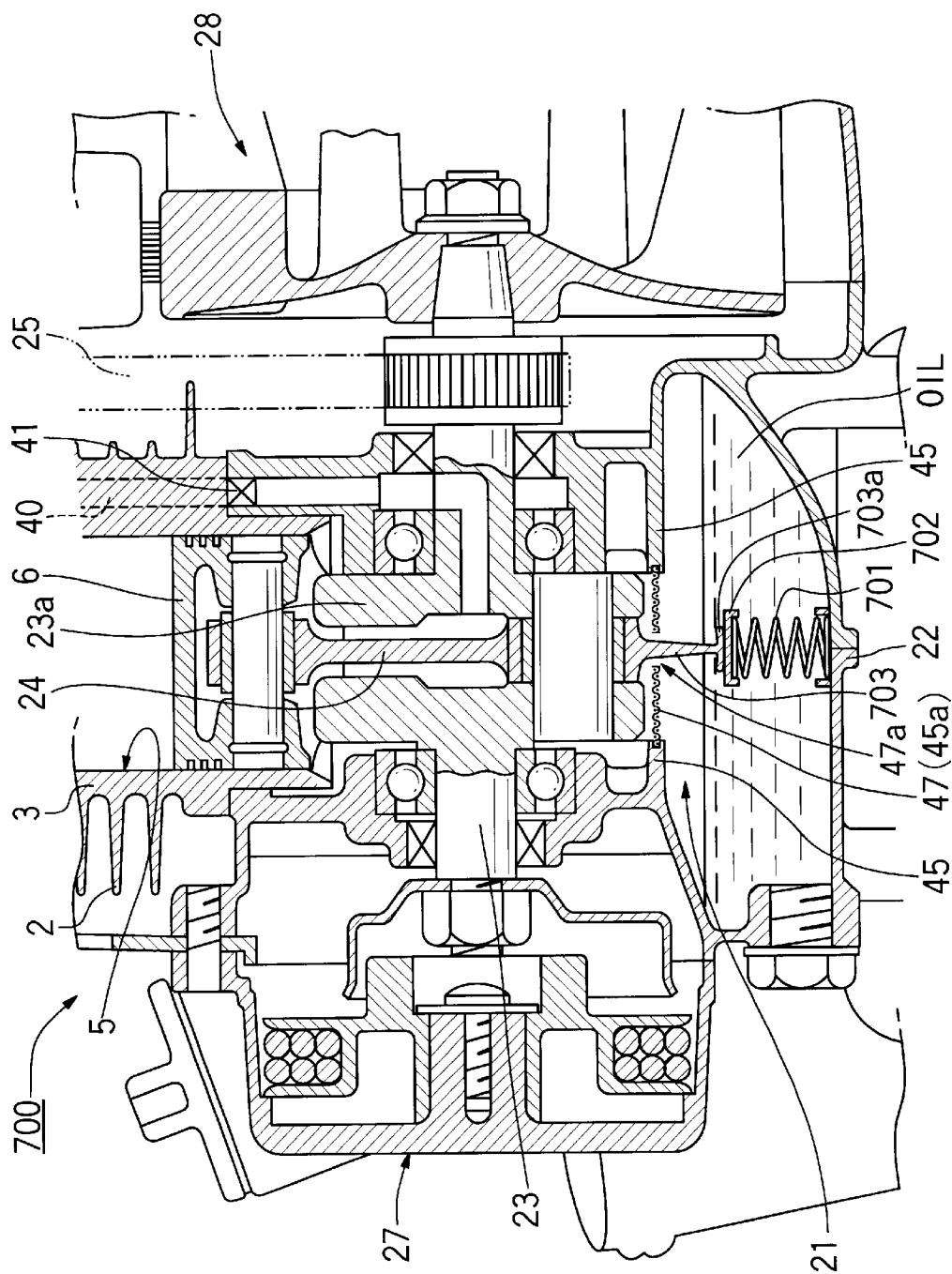
FIG. 16 is a longitudinal cross-sectional view taken along the crankshaft, illustrating a lower portion of the engine in accordance with the seventh embodiment shown in FIG. 15.

FIGS. 15 and 16 show a seventh embodiment of the present invention, including an engine 700 that can be either of the four stroke cycle internal combustion engine of the first embodiment or the two stroke cycle internal combustion engine of the second embodiment. A coil spring 701 is vibrated by the engine vibration, and whereby a cap plate 702 attached to a free end 701b of the coil spring 701 makes an upward and downward motions or a swing motion. The motion of the cap plate 702 agitates the engine oil (OIL) in the oil reservoir 21 to ruffle an entire oil surface, and the engine oil entering thereby into the crank chamber 20 is impinged on the rotating crankshaft 23 to generate the oil mist.

Further, the modified engine 700 of the seventh embodiment has a contact member 703 radially projecting from the connecting rod 24, so that a tip 703a of the contact member 703 may come into contact with the cap plate 702 to compress or swing the coil spring 701 by force. As for the engine 700 of the seventh embodiment, since the coil spring 701 is arranged along an axial line of the cylinder bore 5, this embodiment is preferably applied to an engine used in an upright position shown in the drawings or to a stationary engine installed in this upright position. At that time, though the engine 700 shown in FIG. 15 has the U-shaped oil reservoir 21 arranged to surround the crank chamber 20, the oil reservoir may be formed by a conventional well-known oil pan arranged only in an underneath area of the crank chamber 20 when the engine is used in the upright position or is a stationary engine installed in this upright position.

Figure 17:
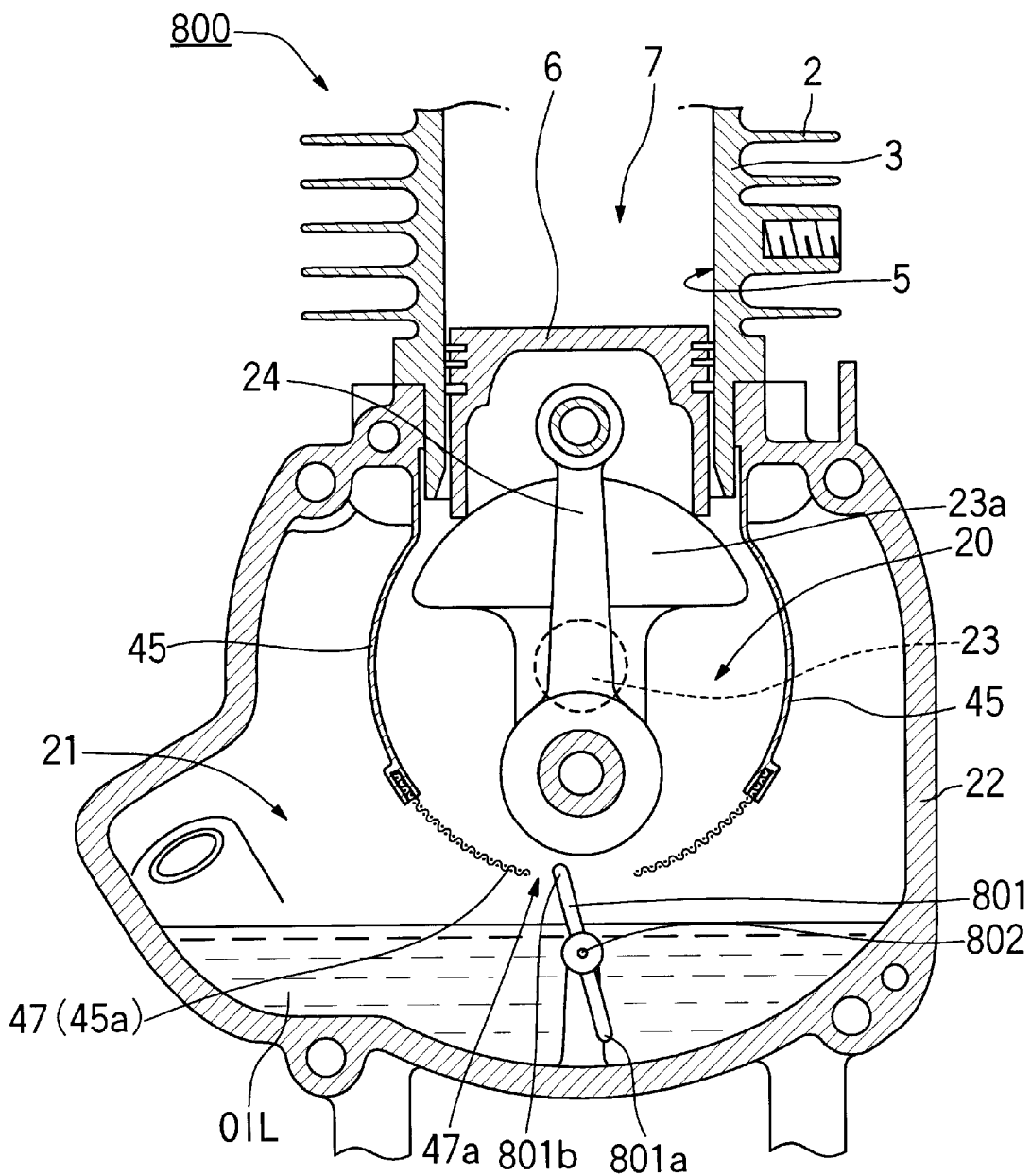
FIG. 17 is a longitudinal cross-sectional view taken along a direction crossing a crankshaft at right angles, illustrating a lower portion of an engine in accordance with an eighth embodiment of the present invention.

An engine 800 of the eighth embodiment shown in FIGS. 17 and 18 has a rotary member 801 arranged in the oil reservoir 21 below the crankshaft 23. The rotary member 801 is rotatable without restriction about an axis 802 extending parallel with the axial line of the crankshaft 23. The axis 802 is arranged on the axis of the cylinder bore 5. The engine 800 may be either a four stroke cycle internal combustion engine as shown in the first embodiment or a two stroke cycle internal combustion engine as shown in the second embodiment. The rotary member 801 is driven to rotate by a strike of the balancing weight 23a of the crankshaft 23 against both outer edge portions 801a and 801b of the rotary member 801 to thereby agitate the engine oil (OIL) in the oil chamber 21 and to ruffle the oil surface thereof. The engine oil which enters into the crank chamber 20 is impinged on the rotating crankshaft 23 and the oil mist is generated thereby.

Since the rotary member 801 is arranged along the axial line of the cylinder bore 5, this embodiment is preferably applied to an engine used in an upright position or to a stationary engine installed in this upright position. Further, though the engine 800 has a U-shaped oil reservoir 21 arranged to surround the crank chamber 20, the oil reservoir may be formed by a conventional well-known oil pan arranged in an underneath area of the crank chamber 20 when the engine is used in the upright position or is a stationary engine installed in the upright position.

Although there have been described various embodiments as above, the present invention is not limited thereto but also includes modifications shown below. As is apparent to a person skilled in the art, the present invention may be applied to any type of engine so far as it is equipped with the oil reservoir, for example, it may be OHV type engine. Although the present invention has been described based upon the preferred embodiments taking a case of a relatively compact engine, it may be applied to an engine for automobile lubricated using an oil pump such that either of the U-shaped coil spring 50, the leaf spring 501 or the upright coil spring 701 is arranged in the oil reservoir made up of the oil pan to be used as an auxiliary lubrication mechanism together with the oil pump.

Moreover, the U-shaped coil spring 50, the leaf spring 501 or the upright coil spring 701 arranged in the oil reservoir 21 may be designed such that the spring resonates at the desired number of revolution of the engine to give a high lubricating effect. For example, the engine which is employed as a power source for the compact working machines such as a portable grass trimmer, a lawn mower, a chain saw or the like, typically has a relatively high idle speed, i.e., 2,000–3,000 rpm, therefore, the U-shaped coil spring 50, the leaf spring 501 or the upright coil spring 701 may be designed to have a natural frequency to resonate at the idle running.

A plurality of U-shaped coil spring 50, leaf spring 501 or upright coil spring 701 may be employed so that each spring may have different natural frequency to resonate at different engine speed, respectively. Each of the U-shaped coil spring 50, the leaf spring 501 or the upright coil spring 701 may be designed to have a plurality of resonance points corresponding to different engine speeds by a single spring. For example, the U-shaped coil spring 50 may have a diameter gradually decreasing along a longitudinal direction thereof so that it may have natural frequencies varying along the length thereof. An appropriate porous material may be employed in place of the wire net 47 so far as it allows the air and the liquid to pass therethrough.

What is claimed is:

1. A method for lubricating an internal combustion engine, said method comprising the steps of:

ruffling engine oil stored in an oil reservoir located adjacent to a crank chamber wherein the step of ruffling includes vibrating a spring member arranged in said oil reservoir to introduce said engine oil into said crank chamber; and impinging said engine oil on a crankshaft provided in said crank chamber to form an oil mist that thereby lubricates said internal combustion engine.

2. The method for lubricating an internal combustion engine in accordance with claim 1, wherein said spring member has a natural frequency which resonates with an engine vibration induced at idle running.

3. A lubrication device for an internal combustion engine, said lubricating device comprising:

a crank chamber;

a crankshaft mounted within said crank chamber;

an oil reservoir arranged adjacent to said crank chamber for containing an engine oil; and a spring member mounted within said oil reservoir so as to be oscillated by an engine vibration wherein the spring vibrates the oil so as to cause misting and thereby lubricate the engine.

4. The lubrication device in accordance with claim 3, wherein said oil reservoir is formed as a U-shape which extends along a locus of a movement of balancing weights of said crankshaft by a partition wall surrounding said crank chamber; and wherein said spring member is arranged so as to extend substantially throughout an entire region of said U-shaped oil reservoir.

5. The lubrication device in accordance with claim 4, wherein said partition wall has an opening which fluidically communicates with said crank chamber and said oil reservoir, and further comprising a net member for covering said opening.

6. The lubrication device in accordance with claim 5, wherein said spring member is a coil spring having ends that are held at respective end portions of said U-shaped oil reservoir so as to be suspended therefrom in said U-shaped oil reservoir.

7. The lubrication device in accordance with claim 5, wherein said spring member is a leaf spring which is supported as a cantilever.

8. The lubrication device in accordance with claim 4, wherein said spring member is a coil spring having ends that are held at respective end portions of said U-shaped oil reservoir so as to be suspended therefrom in said U-shaped oil reservoir.

9. The lubrication device in accordance with claim 4, wherein said spring member is a leaf spring which is supported as a cantilever.

\* \* \* \* \*